United States Patent
Cao et al.

(10) Patent No.: US 9,398,557 B2
(45) Date of Patent: Jul. 19, 2016

(54) DETERMINING LOCATION OF A USER OF A MOBILE DEVICE

(71) Applicant: International Business Machines Corporation, Armonk, NY (US)

(72) Inventors: Heng Cao, Shanghai (CN); Ju Wei Shi, Beijing (CN); Chen Wang, Beijing (CN); Lan Jun Wang, Beijing (CN); Yu Wang, Shanghai (CN); Jia Zou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/724,877

(22) Filed: May 29, 2015

(65) Prior Publication Data

US 2015/0350851 A1    Dec. 3, 2015

(30) Foreign Application Priority Data

May 30, 2014    (CN) .......................... 2014 1 0239121

(51) Int. Cl.
*H04W 64/00*    (2009.01)
*H04W 4/04*    (2009.01)
*H04M 15/00*    (2006.01)

(52) U.S. Cl.
CPC .............. *H04W 64/00* (2013.01); *H04M 15/41* (2013.01); *H04W 4/04* (2013.01)

(58) Field of Classification Search
CPC ............ H04M 2215/32; H04M 15/00; H04M 2215/2026; H04M 17/00; H04W 4/24
See application file for complete search history.

(56) References Cited

U.S. PATENT DOCUMENTS

| | | | |
|---|---|---|---|
| 8,423,047 | B1 | 4/2013 | Zang et al. |
| 2011/0212721 | A1* | 9/2011 | Chang .................... H04M 15/00 455/433 |
| 2013/0316741 | A1 | 11/2013 | Frias Martinez et al. |
| 2014/0004875 | A1 | 1/2014 | Agarwal et al. |
| 2015/0304863 | A1* | 10/2015 | Gupta ..................... H04W 4/04 455/423 |

FOREIGN PATENT DOCUMENTS

WO    2011139841 A2    11/2011

OTHER PUBLICATIONS

Heng Cao, et al.,"Determining Location of a User of a Mobile Device," U.S. Appl. No. 14/747,022, filed Jun. 23, 2015.
List of IBM Patents or Patent applications Treated as Related; Date Filed: May 29, 2015, pp. 1-2.

(Continued)

*Primary Examiner* — Kashif Siddiqui
(74) *Attorney, Agent, or Firm* — Cantor Colburn LLP; Kelvan Razavi (57) ABSTRACT

A method of determining location of a user of a mobile device based on Call Detail Records (CDRs) includes determining data in CDRs related to the user; determining base stations associated with communication locations of the user and corresponding statistical data about communication frequency according to the determined data in the CDRs; and determining location of the user based on at least three determined base stations and the corresponding statistical data about communication frequency as well as physical coordinates of the three base stations.

8 Claims, 4 Drawing Sheets

(56) References Cited

OTHER PUBLICATIONS

R. Ahasa et al.,"Evaluating Passive Mobile Positioning Data for Tourism Surveys: An Estonian Case Study," Tourism Management vol. 29 Issue3, Jun. 2008, pp. 469-486.

R.Ahas et al.,"Using Mobile Positioning Data to Model Locationsmeaninfgul to Users of Mobile Phones," Journal of Urban Technology vol. 17, Issue 1, 2010, pp. 1-26.

* cited by examiner

DETERMINING LOCATION OF A USER OF A MOBILE DEVICE

FOREIGN PRIORITY

This application claims priority to Chinese Patent Application No. 201410239121.1, filed May 30, 2014, and all the benefits accruing therefrom under 35 U.S.C. §119, the contents of which in its entirety are herein incorporated by reference.

BACKGROUND

Embodiments of the present invention relate to field of locating a user, and more specifically, to a method and apparatus of determining location of a user based on CDR data.

Nowadays, telecommunication operators possess a large amount of Call Detail Record (CDR) data, which is data passively collected without any operation at user side and value therein is yet to be explored; in particular, user location information is one type of very useful information.

There are various user locating methods in the art. For example, GPS locating is precise but there is no GPS information in CDR data. The location method based on a three-base station is an active location method, which requires base stations to interact with user's handheld terminal and thus is not applicable to CDR data. High precision information can also be obtained by installing an APP on user's handheld terminal, but people covered by the APP is limited (mainly people interested in content of the APP), thus it is very difficult for an APP based third part company to provide service information covering a broad range of people, and it has obvious limitations.

SUMMARY

In view of the above problems in the art, there is a need for a solution for locating a user based on CDR. To this end, embodiments of the present invention provide a method and apparatus of locating a user based on CRD data.

According to an aspect of the present invention, there is provided a method of determining a user's location based on Call Detail Record (CDR), the method may comprising: determining data in CDRs related to current user; determining base stations associated with communication locations of the current user and corresponding statistical data about communication frequency according to the determined data in the CDRs; and determining location of the user based on at least three determined base stations and the corresponding statistical data about communication frequency as well as physical coordinates of the three base stations.

According to another aspect of the present invention, there is provided an apparatus of determining a user's location based on Call Detail Record (CDR), the apparatus may comprising: a determining module configured to determine data in CDRs related to current user; a statistics collecting module configured to determine base stations associated with communication locations of the current user and corresponding statistical data about communication frequency according to the determined data in the CDRs; and a calculating module configured to determine location of the user based on at least three determined base stations and the corresponding statistical data about communication frequency as well as physical coordinates of the three base stations.

In an improved embodiment, by also taking into account community relationship of the user, time span of data required to determine location can be reduced, and also less CRD data related to the user is needed, which is especially suitable for the case when some user does not have sufficient base station statistical data, and in such case, location of that user may be determined in conjunction with data of his/her community.

It is appreciated from the following description that, with embodiments of the present invention, user's location may be conveniently determined based on CDRs.

BRIEF DESCRIPTION OF THE DRAWINGS

Through the more detailed description of some embodiments of the present disclosure in conjunction with accompanying drawings, the above and other objects, features and advantages of the present disclosure will become more apparent, wherein the same reference generally refers to the same components in the embodiments of the present disclosure.

DETAILED DESCRIPTION

It can be seen from the above that, existing location methods either require a user to install software on a terminal, or make operation complicated, or increase energy consumption, all of which are not applicable to CDR data.

Therefore, there is a need for a technical solution which is capable of conveniently determining user's location based on Call Detail Record (CDR) data.

Embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
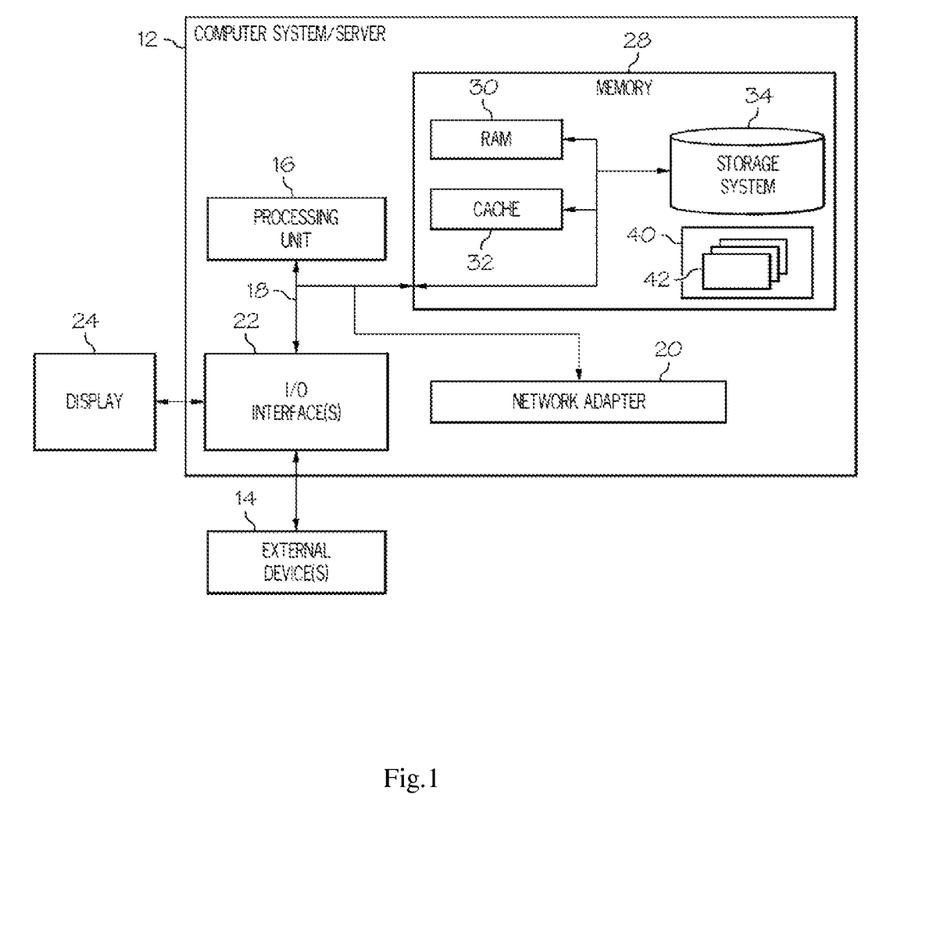
FIG. 1 shows a block diagram of an exemplary computer system/server which is applicable to implement the embodiments of the present invention.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In embodiments of the present invention, Call Detail Record (CDR) is database record containing data related to a certain call, and may include various detail information about one conversation.

TABLE 1

| | CALLER_ID | CALLER_LOCATION_ID | CDR_TIME | CDR_TYPE | CALLEE_ID | CALLEE_LOCATION_ID |
|---|---|---|---|---|---|---|
| 1 | 81a16cd164f89afe | df3475642c26ea2f | 2009-03-09 09:34:00.720.. | RTT | d3e27c6b9368b85b | unknown |
| 2 | e1efd7238f3c27d3 | df3475642c26ea2f | 2009-03-09 09:34:45.120.. | RTT | 4b7996ec6e218b0f | 6bd3ab4cb62c9783 |

Table 1 shows part of content in a CDR table according to an embodiment of the present invention (real telephone numbers are concealed and substituted with IDs by the telecommunication company for purpose of protecting customer information). As shown in Table 1, it includes caller ID (CALLER_ID), caller location ID (CALLER_LOCATION_ID), call record time (CDR_TIME), call record type (CDR_TYPE), callee ID (CALLEE_ID), and callee location ID (CALLEE_LOCATION_ID).

TABLE 2

| | LOCATION_ID | LONGITUDE | LATITUDE |
|---|---|---|---|
| 1 | 7e83c5db5b40768b | 117.645235 | 24.514601 |
| 2 | 28ac269eb0c57ed5 | 117.646675 | 24.513392 |
| 3 | 7ccad41ac3f752a1 | 117.644467 | 24.513179 |

Table 2 shows corresponding relationship between location ID (LOCATION_ID) and latitude and longitude, from this relationship table, specific latitude and longitude of a caller location ID or a callee location ID can be specifically determined.

Figure 2:
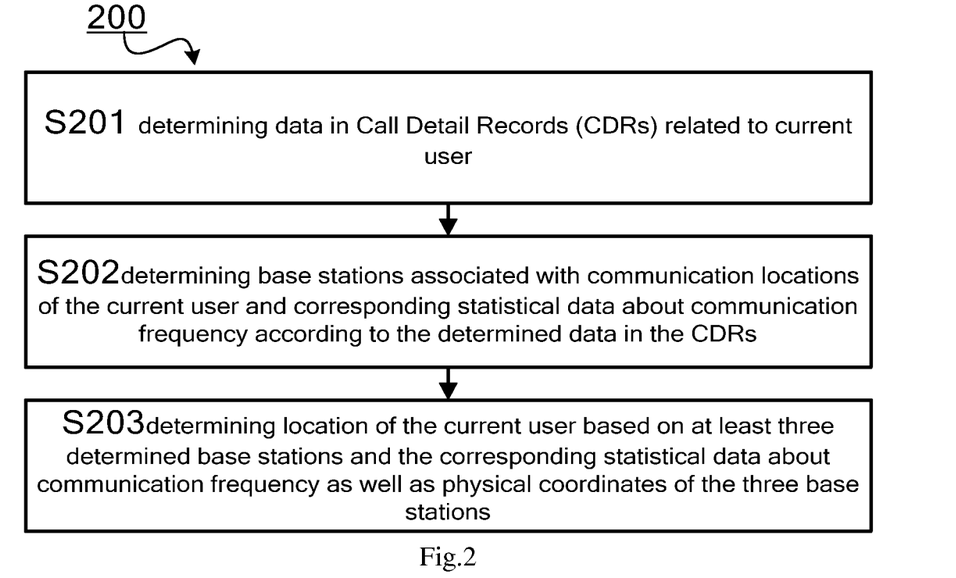
FIG. 2 shows a schematic flowchart of a method of determining a user's location based on CDR data according to one exemplarily embodiment of the present invention.

FIG. 2 shows a schematic flowchart of a method 200 of determining a user's location based on CDR data according to one exemplary embodiment of the present invention.

In operation S201, determining data in CDRs related to current user.

In one embodiment, data in all the CDRs for communication of one user may be used as the determined data record. For example, CDR record related to one user may be determined according to CALLER_ID or CALLEE_ID in the CDRs. The determined data record may be further limited by time, that is, if it is desirable to obtain user's location within a certain period, limitation may be made through corresponding period. The selection of specific period does not need to be strictly limited, if a precise location needs to be obtained, a shorter period may be selected, and if a location having statistical meaning is to be obtained, a longer period may be chosen. Therefore, a specific period may be a shorter period such as minute, hour, and so on, or may be a longer unit such as day, week, month or even year. So, what is finally determined is a location where the user is in corresponding period.

In another embodiment, determining data in CDRs related to the current user comprises: determining data in the CDRs related to certain type of location of the current user. The certain type of location is usually embodied as an area where the user regularly stays for certain time, it can reflect a user-specific life scene and is a meaningful location, it helps to filter out noisy information and accurately dig out location where user frequently appears, thus it is capable of improving precision of location result and application value. Thus, a person skilled in the art will appreciate that, when determining data related to certain type of location is not employed, the determined location is an approximate location where user is during a certain period, and when that operation is employed, it is to specifically determine particular physical location of each certain type of location of the user subdivided within that period.

Whether a CDR record is related to a certain type of living location may be judged based on an existing rule or living experience. Therefore, in a more specific embodiment, determining data in the CDRs related to certain type of location of the current user comprises: determining data in the CDRs related to a particular type of living location of the current user based on a predetermined rule. Wherein, the predetermined rule includes a corresponding time period determined for at least one living scene (working, living, sporting, etc). For example, CDR records occurred from 9:00 to 18:00 are usually related to working site, and conversation records occurred from 20:00 to 8:00 are related to home of the user.

In another embodiment, at least one meaningful location may also be determined based on a clustering algorithm. How to dig out a regular area belongs to prior art, next, the applicant will only exemplarily give one example for purpose of description, and other implementations will not be described for brevity. Specifically, the exemplarily flow may comprise the following two sub-steps: in sub-step 1, finding all reference location points based on spatial processing to filter out spatial noise. Specifically, this includes: a) dividing a spatial area to be analyzed into grids with length of w and width of h, and collecting statistics about frequency at which the user appears in each of the grids according to CDR records. Wherein, size of a grid is determined by resolution of spatial data; b) taking k grids whose frequency are higher than a predetermined threshold as reference location points. In sub-step 2, based on temporal processing, for each reference location point, detecting its corresponding period. Specifically, this includes: a) for each reference location point, generating a binarized time sequence based on time, that is, abscissa axis represents time, value 1 in vertical axis represents that user arrives at that location, and 0 represents that user does not arrive at that location; b) performing discrete Fourier transformation on the above time sequence to conduct period analysis; and c) if there is shown periodicity, then it is taken as a meaningful location.

In operation S202, determining base stations associated with communication of the current user and corresponding statistical data about communication frequency according to the determined data in the CDRs.

CDR data will contain therein information about base stations with which all past communication are conducted, for example, "CALLER LOCATION ID" is an identification number of a base station used by a caller, and "CALLEE LOCATION ID" is an identification number of a base station used by a callee. As long as data in related CDRs is determined and then combined with type of the user (caller or callee), it is easy to collect statistics about usage frequency of the user on each base station.

In one embodiment, the method further comprising: determining a community related to the current user, the community being determined according to CDRs of all the users; determining base stations related to the current user and the corresponding statistical data about communication frequency based on the community related to the current user. A plurality of communities formed by using conversation information may be determined through a Community Detection algorithm according to CDR records of all users, and then the community to which the current user belongs is the community related to the current user.

Figure 3:
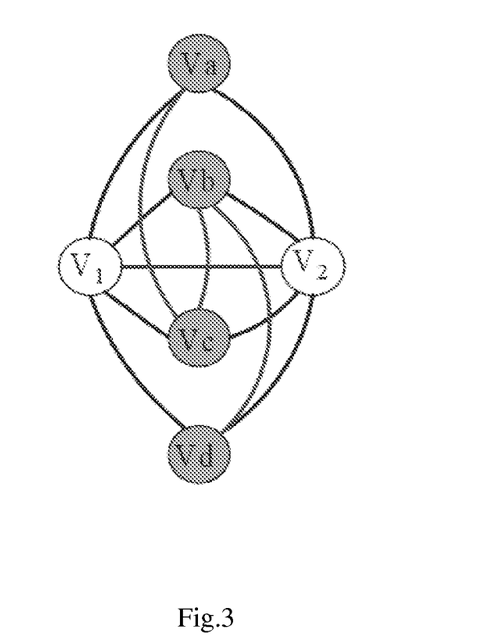
FIG. 3 shows a diagram of propinquity based community detection according to one exemplarily embodiment of the present invention.

Community detection is essentially a clustering algorithm, and there is a plurality of optional algorithms in the art, e.g., Clique, Hierarchical Clustering, Spectral Clustering, Graph Partition, Propinquity based algorithm, and so on, which will not be described herein for brevity. Next, only a Propinquity based community detection method will be described by taking FIG. 3 for example, in which each point represents one user, and an edge between two points means that there is communication behavior between users, and propinquity between two points may be defined as:

$$P_G(v_1, v_2) \equiv |E(v_1, v_2)| + |N_G(v_1) \cap N_G(v_2)| + |E(G[N_G(v_1) \cap N_G(v_2)])|$$

Wherein, the first term represents number of edges between two points, for example, if there is an edge between two points 1 and 2, then number of edges is 1; the second term represents number of neighbors common to two points, as shown in FIG. 3, ABCD are neighbors common to points 1 and 2, that is, number of common neighbors is 4; and the third term represents number of edges existing between common neighbors of two points (also referred to as Conjugate Variable), in FIG. 3, there are 3 edges among ABCD. In total, propinquity of the two points 1 and 2 is 8.

Based on definition of propinquity, community detection may be performed through an iteration method, and specific iteration rule is as follows:

$$\begin{cases} \text{If } P(v_1, v_2) \leq \alpha \text{ and } (v_1, v_2) \in E(G) \text{ then } E(G) \leftarrow E(G) - \{(v_1, v_2)\} \\ \text{If } P(v_1, v_2) \geq \beta \text{ and } (v_1, v_2) \notin E(G) \text{ then } E(G) \leftarrow E(G) + \{(v_1, v_2)\} \end{cases}$$

Wherein the rule at the first row represents: when propinquity of two points is less than a given threshold α and there is an edge between the two points, then this edge is removed from the graph; and rule at the second row represents: when propinquity of two points is larger than a given threshold β and there is no edge between the two points, then an edge is added in the graph. With the above rule, all points in the graph are detected two by two and when there is no change at any of edges, i.e., reach convergence, then the detection is stopped. Finally, all points having connection relationship form a community.

Next, the embodiment of operation S202 in FIG. 2 will be continually described in one embodiment, determining base stations related to the current user and the corresponding statistical data about communication frequency based on the community related to the current user comprises: determining at least one group from the community of the user, each of the groups having a same particular location; for each of the particular locations, collecting statistics about base stations related to users in the group and corresponding usage frequency. In one embodiment, it is to directly accumulate in that group statistical data about all users versus corresponding base stations. Each group may also be further filtered, e.g. filter out users also having other same friends, then base stations and statistical data about usage frequency are determined based on the filtered user data.

In operation S203, determining location of the user based on at least three determined base stations and the corresponding statistical data about communication frequency as well as physical coordinates of the three base stations.

There are a variety of techniques in the art for performing localization according to three base stations whose location are known, for example, TOA (Time of Arrival), TDOA (Time Difference of Arrival) are both propagation time characteristics based location methods. Such propagation time characteristics based location methods all determine location of an apparatus through three pairs of [Position$_i$, T$_i$] (i=1, 2, 3), wherein Position, is physical location of the i-$^{th}$ base station, and Ti is corresponding propagation time characteristics (TOA or TDOA). The basic principle of this method is to obtain T$_i$ (i=1, 2, 3), and obtain distance R$_i$ from the apparatus to a base station i through T$_i$*c, then establish an equation set according to geometry knowledge, and obtain the specific location by solving the equation set.

In a location method based on measurement of signal power, it estimates distance from a terminal to a base station by measuring field strength of the received signal and a known channel fading model as well as field strength value of the transmitted signal; and then obtains location of the terminal according to multiple sets of three distance values.

Figure 4:
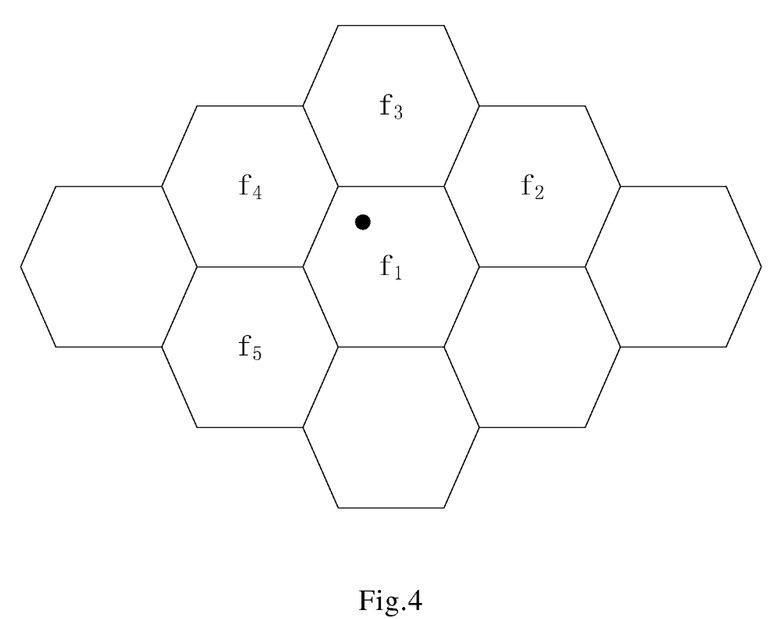
FIG. 4 shows a specific scenario in which one embodiment of the present invention is presented.

FIG. 4 shows a specific scenario in which the present embodiment is applied, in FIG. 4, f1-f5 in respective cells represent usage frequency of corresponding base station, respectively. In particular, for the technical solution according to one embodiment of the present application, when performing improved three-base-station localization for user, location of the user is estimated by applying usage frequency of each base station as weight. Although location of the user may keep unchanged, two conversations may be served by different cells, therefore, statistical data about frequency can reflect strength of signal in a certain degree, and the present application is characterized in that, statistical data about frequency is used to reflect physical distance from the user to each base station.

In particular, in one embodiment, location may be determined through an equation set defined by equations 1, 2, 3.

$$\frac{(x-x_1)^2+(y-y_1)^2}{(x-x2)^2+(y-y2)^2}=\frac{f_2}{f_1} \quad \text{equation (1)}$$

$$\frac{(x-x_1)^2+(y-y_1)^2}{(x-x_3)^2+(y-y_3)^2}=\frac{f_3}{f_1} \quad \text{equation (2)}$$

$$\frac{(x-x_1)^2+(y-y_1)^2}{(x-x_4)^2+(y-y_4)^2}=\frac{f_4}{f_1} \quad \text{equation (3)}$$

wherein f1, f2, and f3 are corresponding usage frequency of the three base stations, respectively, and (x$_i$, y$_i$), (x$_2$, y$_2$), and (x$_3$, y$_3$) represent physical coordinate of each base station, respectively. Physical coordinate (x, y) of one meaningful location point represented by the black circle dot in FIG. 4 can be solved through the equation set composed of the above three equations.

In one embodiment, three base stations having the highest usage frequency are selected to determine location of the user. In another embodiment, three recently used base stations are selected to determine location of the current user.

When performing three-base-station localization, it is necessary to at least obtain statistical data about frequency at which user utilizes the three base stations, but there is often the case that sufficient data cannot be obtained for some users, for example, within CDR records for 5 users, only CRD records for two users can provide data about usage frequency of at least three base stations, thus only location of the two users can be determined. For the remaining three users, three-base-station localization cannot be performed due to data being incomplete.

Therefore, in a further embodiment of the present application, base stations and corresponding usage frequency may be determined according to community. In fact, in a community, not every user has data about usage frequency for at least three base stations, however, due to existence of community relationship, it is possible to extend data through social network characteristics in case there is a small amount of data, thereby determining location of more users.

Figure 5:
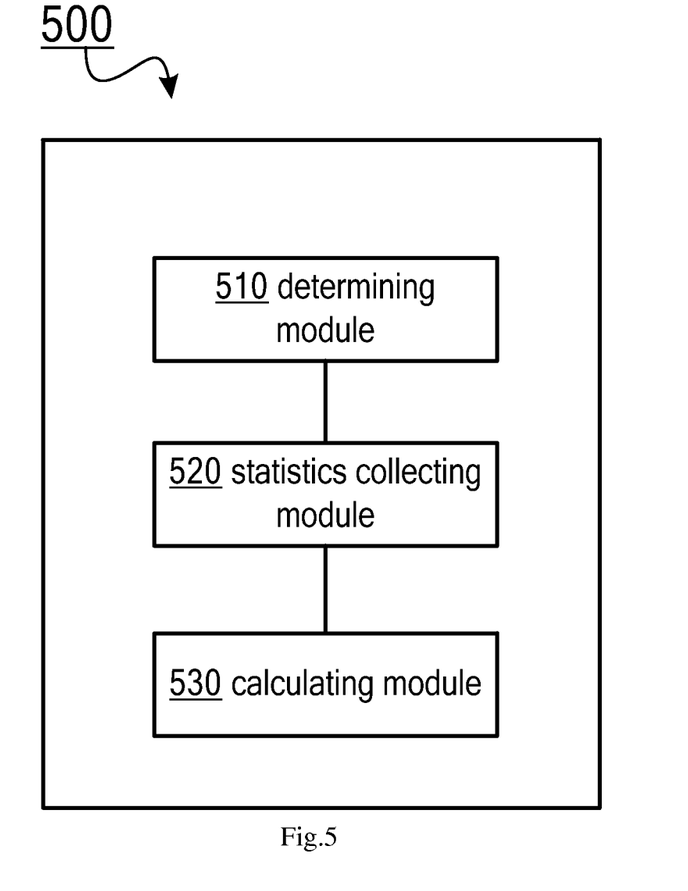
FIG. 5 shows a diagram of an apparatus of determining user's location based on CDR data according to one exemplarily embodiment of the present invention.

FIG. 5 shows a schematic block diagram of an apparatus 500 of determining user location based on Call Detail Records (CDRs) according to one exemplarily embodiment of the present invention. According to an embodiment of the present invention, the apparatus 500 may include a determining module 510 configured to determine data in the CDRs related to current user; a statistics collecting module 520 configured to determine base stations associated with communication locations of the current user and corresponding statistical data about communication frequency according to the determined data in the CDRs; a calculating module 530 configured to determine location of the user based on at least three determined base stations and the corresponding statistical data about communication frequency as well as physical coordinates of the three base stations.

According to one embodiment of the present application, wherein the determining module 510 comprises a module configured to determine data in the CDRs related to certain type of location of the current user; and wherein the calculating module 530 comprises a module configured to determine physical coordinate of the certain type of location of the current user.

According to one embodiment of the present application, the determining module 510 includes a module configured to determine data in the CDRs related to a particular type of location of the current user based on a predetermined rule.

According to one embodiment of the present application, the determining module 510 includes a module configured to determine data in the CDRs related to a particular type of location of the current user based on a clustering algorithm.

According to one embodiment of the present application, the apparatus 500 further includes a module configured to determine a community related to the current user, the community being determined according to CDRs of all the users; and a module configured to determine base stations related to the current user and the corresponding statistical data about communication frequency based on the community related to the current user.

According to one embodiment of the present application, the module configured to determine base stations related to the current user and the corresponding statistical data about communication frequency based on the community related to the current user comprises: a module configured to determine at least one group from the community of the user, each of the groups having a same particular location; a module configured to, for each of the particular locations, collect statistics about base stations related to users in the group and corresponding usage frequency.

According to one embodiment of the present application, the apparatus is further configured to select three base stations having the highest frequency to determine the location of the current user. In another embodiment of the present application, the apparatus is further configured to select three recently used base stations to determine the location of the current user.

In a solution of the present application, usage frequency of each base station is used as weight to estimate user location, it belongs to a passive localization solution, does not need user to install any software in terminal, and can perform localization directly through data of operators. In addition, related information of users belonging to a same community as the current user may be added to further utilize community information to improve precision in localization.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus for determining location of a user of a mobile device, comprising:
  a determining module configured to determine data in Call Detail Records (CDRs) related to current user;
  a statistics collecting module configured to determine base stations associated with communication locations of the current user and corresponding statistical data about communication frequency according to the determined data in the CDRs; and
  a calculating module configured to determine location of the user based on at least three determined base stations and the corresponding statistical data about communication frequency as well as physical coordinates of the three base stations.

2. The apparatus of claim 1, wherein:
  the determining module comprises a module configured to determine data in the CDRs related to certain type of location of the current user; and
  the calculating module comprises a module configured to determine physical coordinate of the certain type of location of the current user.

3. The apparatus of claim 2, wherein the determining module comprises a module configured to determine data in the CDRs related to a particular type of location of the current user based on a predetermined rule.

4. The apparatus of claim 2, wherein the determining module comprises a module configured to determine data in the CDRs related to a particular type of location of the current user based on a clustering algorithm.

5. The apparatus of claim 1, further comprising:
  a module configured to determine a community related to the current user, the community being determined according to CDRs of all users; and
  a module configured to determine base stations related to the current user and the corresponding statistical data about communication frequency based on the community related to the current user.

6. The apparatus of claim 5, wherein the module is configured to determine base stations related to the current user and the corresponding statistical data about communication frequency based on the community related to the current user comprises:
  a module configured to determine at least one group from the community of the user, each of the groups having a same particular location; and
  a module configured to, for each of the particular locations, collect statistics about base stations related to users in the group and corresponding usage frequency.

7. The apparatus of claim 1, wherein three base stations having the highest frequency are selected to determine the location of the current user.

8. The apparatus of claim 1, wherein three recently used base stations are selected to determine the location of the current user.

* * * * *